July 24, 1962 P. H. BLACHLY 3,045,263
RAFT STRUCTURE
Filed June 26, 1961 5 Sheets-Sheet 3

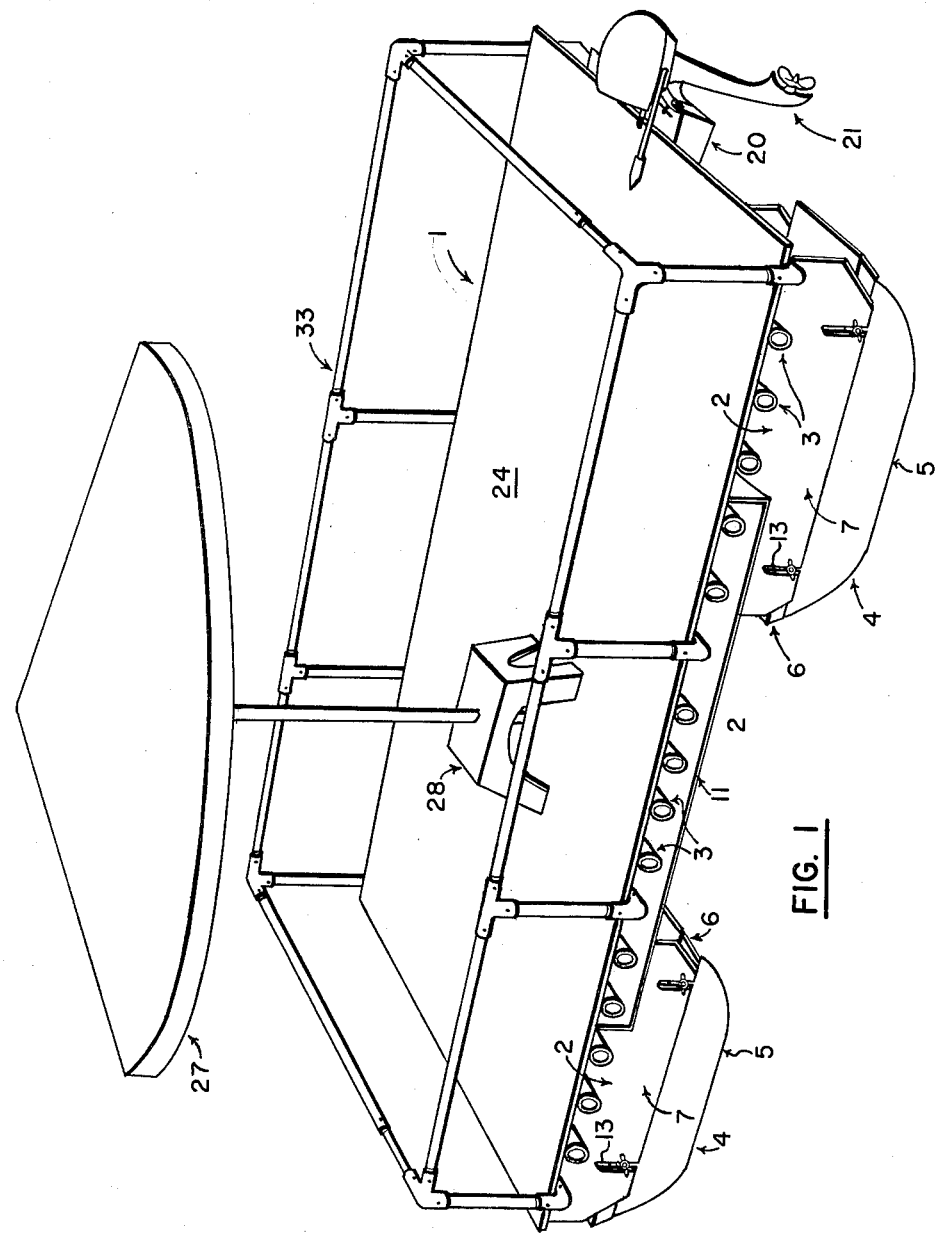

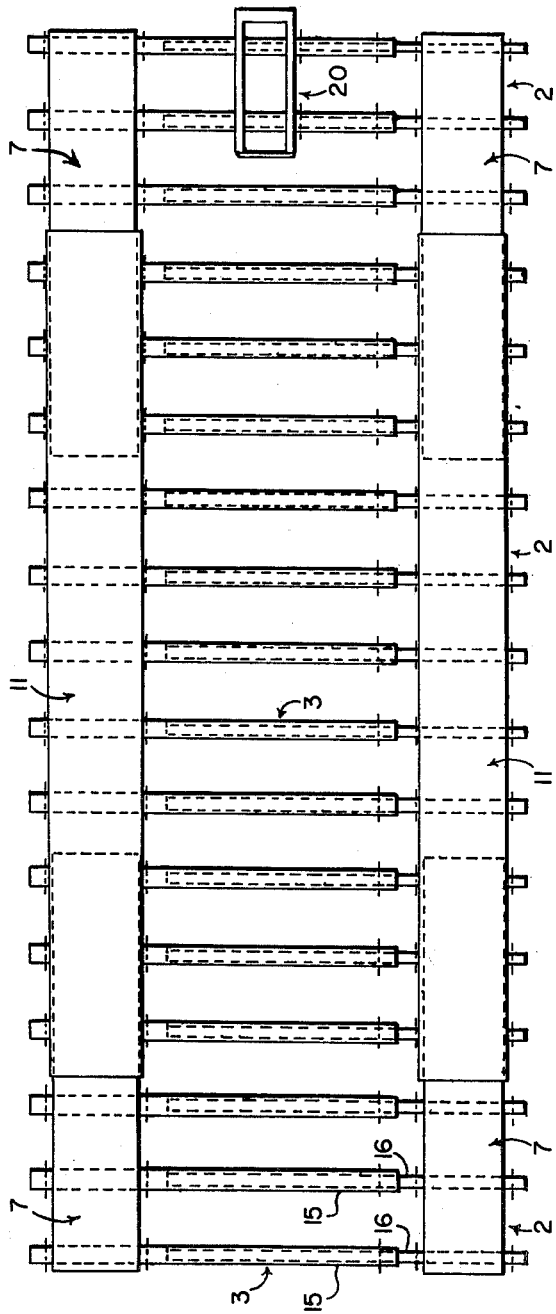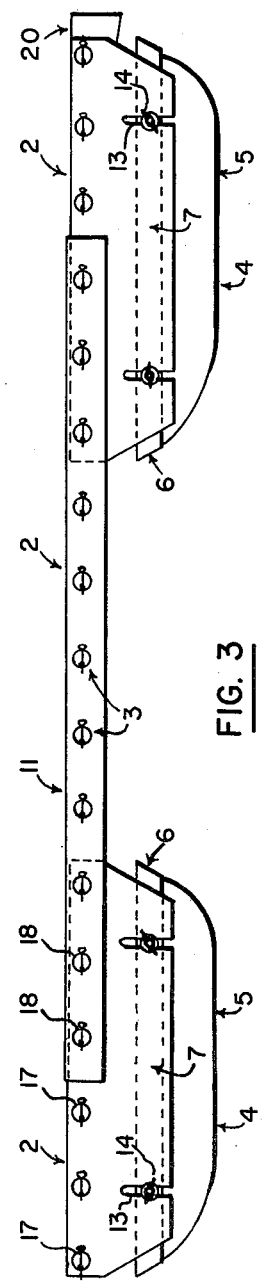

INVENTOR.
PAUL H. BLACHLY
BY
ATTORNEY

July 24, 1962 P. H. BLACHLY 3,045,263
RAFT STRUCTURE
Filed June 26, 1961 5 Sheets-Sheet 4
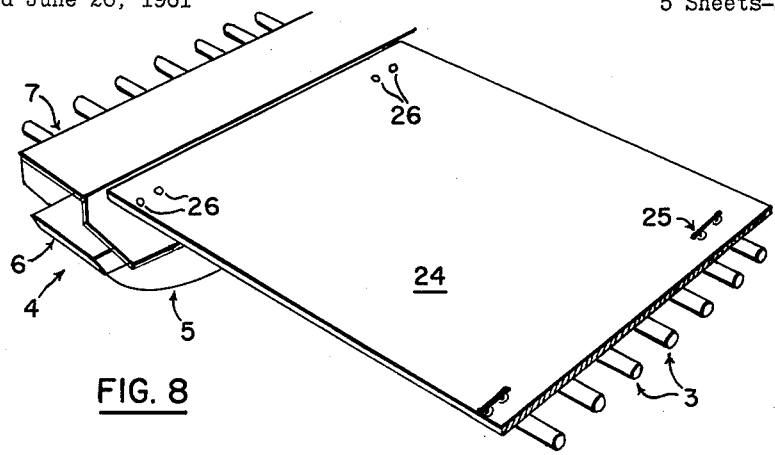
FIG. 8
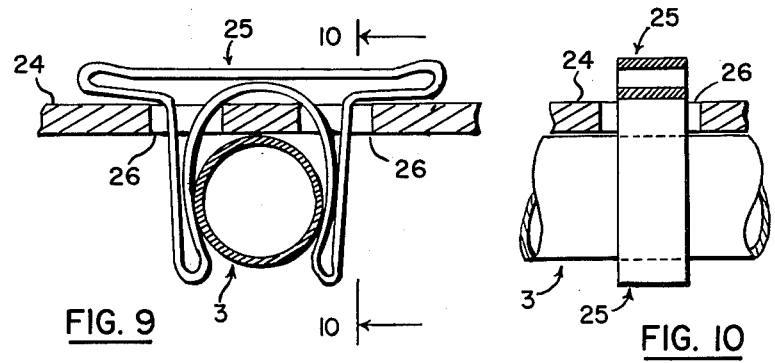
FIG. 9  FIG. 10
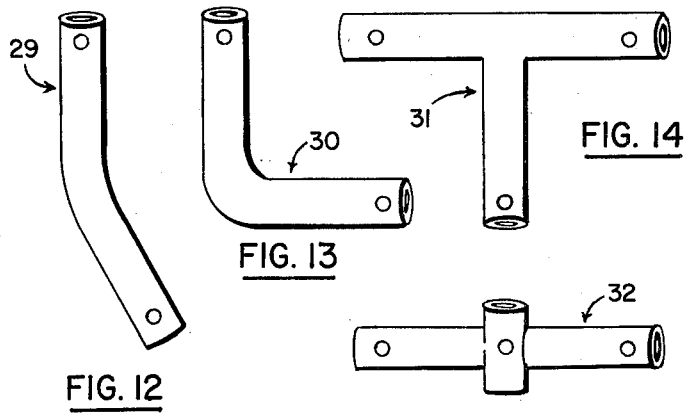
FIG. 12  FIG. 13  FIG. 14
FIG. 15
INVENTOR.
PAUL H. BLACHLY
BY
ATTORNEY July 24, 1962 P. H. BLACHLY 3,045,263
RAFT STRUCTURE
Filed June 26, 1961 5 Sheets-Sheet 5

INVENTOR.
PAUL H. BLACHLY
ATTORNEY

United States Patent Office 3,045,263
Patented July 24, 1962

3,045,263
RAFT STRUCTURE
Paul H. Blachly, Fort Worth, Tex.
(3250 SW. Underwood Drive, Portland 25, Oreg.)
Filed June 26, 1961, Ser. No. 119,442
4 Claims. (Cl. 9—1)

This invention relates to a raft structure, and it concerns more particularly certain features of construction, as hereinafter described, which advantageously may be incorporated in small rafts which are designed to provide floating platforms for pleasure use, fishing, water sports, and the like, and which usually have outboard motors mounted thereon for use in propelling them from one place to another.

An object of the invention is to provide a raft structure as described having a platform which is adjustably positioned above the surface of the water, the structure being of light weight and having a plurality of float units each characterized by a high degree of buoyancy relative to its weight and designed to plane along the surface of the water, displacing little water and offering substantially no resistance to movement of the raft on the water.

Another object of the invention is to provide a raft structure having a platform which is formed in part by elongated frame members arranged longitudinally and transversely relative thereto, the frame members each comprising a plurality of sections which are adjustable telescopically relative to each other whereby the dimensions of the platform may be varied as desired.

A still further object of the invention is to provide a raft structure which is formed entirely of prefabricated parts adapted to be assembled and disassembled without special tools.

Another object of the invention is to provide such a raft structure having a plurality of float units each including an expandable float element which is characterized by its light weight and its inherent buoyancy but is not necessarily indestructible, and which is interchangeable with other like float elements.

The invention will be readily understood by referring to the following description and the accompanying drawing, in which:

FIG. 1 is a perspective view showing a raft having incorporated therein a structure embodying this invention;

FIG. 2 is a top plan view of the raft structure shown in FIG. 1 with the deck plates and side rails removed;

FIG. 3 is a side elevational view thereof;

FIG. 8 is a fragmentary perspective view illustrating the manner in which the deck plates are secured to the transverse frame members;

FIG. 9 is a fragmentary sectional elevational view showing one of the transverse frame members in association with a deck plate, and showing one of the removable fastening devices whereby they are connected;

FIG. 10 is a sectional elevational view taken on the line 10—10 of FIG. 9;

Figures 16, 17:
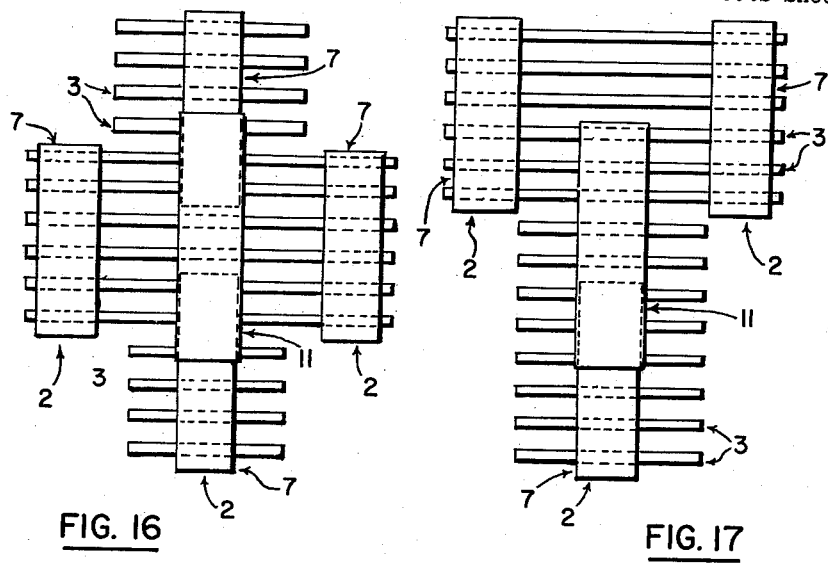
Figure 11:
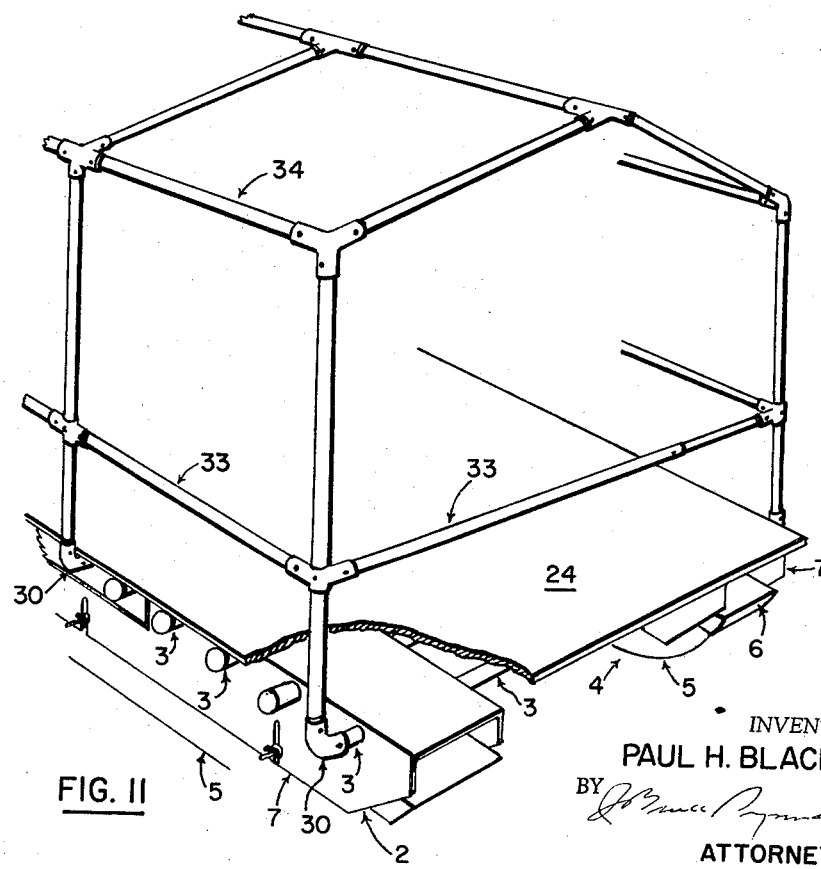
FIG. 11 is a fragmentary perspective view showing a raft structure similar to that of FIG. 1, and illustrating the manner in which the side rails and the canopy support are connected to end portions of selected transverse frame members which extend outwardly beyond the adjacent longitudinal frame members.

FIGS. 12 to 15 are detail views illustrating the tubular fittings which are employed in the construction of the side rails shown in FIG. 1 and the side rails and canopy support of FIG. 11; and FIGS. 16 and 17 are top plan views each showing diagrammatically a modified arrangement of the longitudinal and transverse frame members which, with the float units, comprise the raft structure of the invention.

As shown in FIGS. 1 to 4 of the drawing, the raft structure of the invention comprises a platform, designated generally by the numeral 1, which is generally rectangular and is formed in part by a pair of longitudinal frame members, indicated generally by the numeral 2, which are arranged along opposite sides thereof and are connected intermediate their ends by a plurality of transverse frame members, indicated generally by the numeral 3.

The platform 1 is supported on two pairs of elongated float units, designated generally by the numeral 4, in vertically adjustable position relative thereto, as hereinafter described.

The float units 4 of each pair are arranged one behind the other in vertical alignment with the longitudinal frame members 2, adjacent opposite ends thereof.

The float units 4 each include an expendable float element 5, which may be of any desired construction and is characterized by its light weight and its inherent buoyancy but is not necessarily indestructible, and which is interchangeable with other like float elements 5.

In one form thereof the float elements 5 advantageously may be formed of molded cellular plastic material, such as Styrofoam, having a surface coating of Fiberglas applied thereto whereby it is impervious to water and its structure is reinforced.

In another form thereof the float elements 5 may comprise hollow bodies of thin walled construction formed of light weight sheet metal, such as aluminum, or alternatively, of molded plastic material.

In another form thereof the float elements 5 may comprise inflatable hollow bodies formed of flexible sheet material, such as plastic, rubber, or water resistant fabric.

As shown, the float elements 5 have parallel sides and parallel top and bottom surfaces, and are curved upwardly and longitudinally outwardly at their ends whereby they are adapted to plane along the surface of the water, displacing little water and offering substantially no resistance to movement of the raft on the water.

The float units 4 each have an adapter tray, designated generally by the numeral 6, formed of light weight sheet metal, such as aluminum, fitted around an upper portion of the corresponding float element 5 and having means removably and adjustably connecting it to an adapter tray holder, indicated generally by the numeral 7, which comprises a section of one of the longitudinal frame members 2, for vertical adjustment relative thereto, as hereinafter described.

The adapter trays 6 each have top, side, and end portions conforming to the upper portion of the corresponding float element 5, one end of the tray 6 being open and having a cover therefor, indicated by the numeral 8, which is connected to the top portion thereof by hinges 9 and has fastening means 10 whereby it is normally secured in its closed position to prevent displacement of the float element 5 relative to the tray 6.

The longitudinal frame members 2 each comprise a plurality of elongated adapter tray holders 7, channel shaped in transvesre section, each straddling a float element 5 and an adapter tray 6 which together form one of the float units 4, and one or more elongated connecting elements, indicated generally by the numeral 11, channel shaped in transverse section, which comprise longitudinal extensions of the adapter tray holders 7 and are adjustable telescopically relative thereto.

The adapter trays 6 are each removably and adjustably connected to the corresponding adapter tray holder 7, for vertical adjustment relative thereto, by a plurality of studs 12 secured to opposite side portions of the adapter tray 6 and extending laterally outwardly therefrom, thru vertical slots 13 therefor in the side flanges of the adapter tray holder 7, beginning at their lower edges, and having wing nuts 14 applied thereto.

The transverse frame members 3 each comprise a pair of tubular sections 15, 16, which are adjustable telescopically relative to each other.

The adapter tray holders 7 and the elongated connecting elements 11 which together comprise the longitudinal frame members 2 have longitudinally spaced openings 17, 18, in the side flanges thereof, the diameter of the openings 17, 18, coresponding to the diameter of the larger section 15 of the transverse frame members 3. The transverse frame members 3 are passed thru the openings 17, 18, of the longitudinal frame members 2, which are adjustably positioned relative thereto.

The adapter tray holders 7 and the elongated connecting elements 11 which together comprise the longitudinal frame members 2, as well as the tubular sections 15, 16, of the transverse frame members 3, are of thin walled construction and advantageously may be formed of light weight metal, such as aluminum.

Suitable bushings (not shown) advantageously may be placed over the portions of the smaller tubular sections 16 of the transverse frame members 3 which are received in the openings 17, 18, of the adapter tray holders 7 and the elongated connecting elements 11.

The adapter tray holders 7 and the elongated connecting elements 11 are secured against longitudinal displacement relative to each other by the sections 15, 16, of the transverse frame members 3, which are passed thru aligned openings 17, 18, in the adapter tray holders 7 and the elongated connecting elements 11, respectively.

Figure 4:
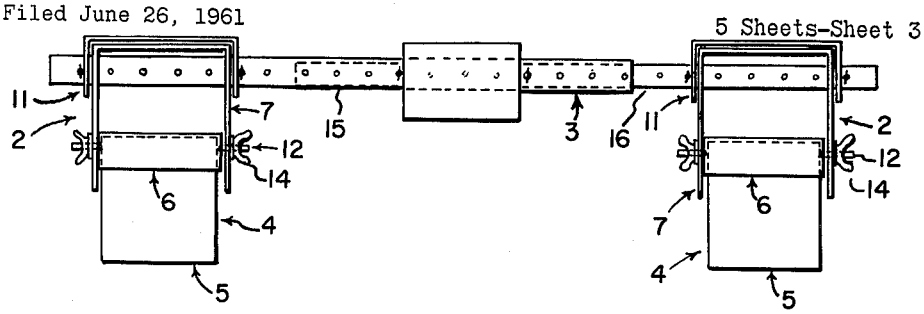
FIG. 4 is a rear elevational view.
Figure 5:
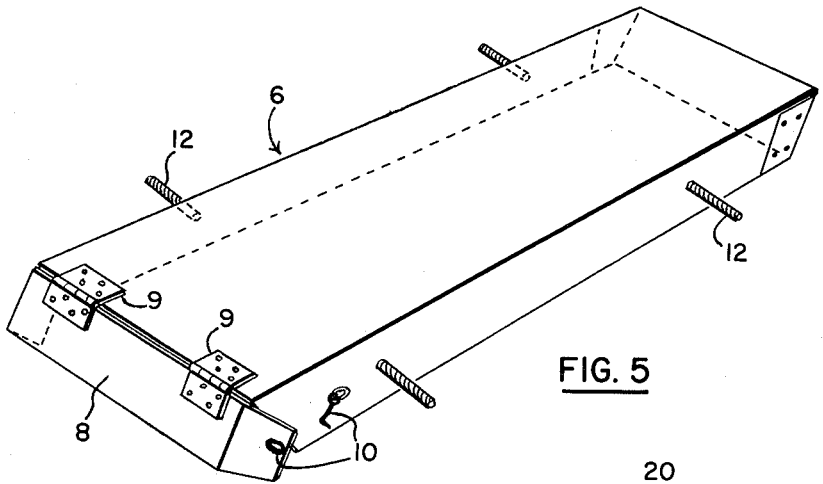
FIG. 5 is a perspective view showing an adapter tray for one of the float elements as viewed from the top thereof.
Figure 7:
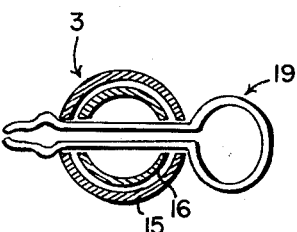
FIG. 7 is a transverse sectional view showing the sections of one of the transverse frame members, which are adjustable telescopically relative to each other, and showing one of the removable fastening devices whereby they are connected.

As shown in FIG. 7, the sections 15, 16, of the transverse frame members 3 are secured in adjusted positions relative to each other by removable fastening devices, indicated generally by the numeral 19, formed of spring wire, which are passed transversely thru aligned openings therefor in the sections 15, 16, in frictional engagement therewith.

The fastening devices 19 consist of modified cotter pins having leg portions which are biased outwardly in opposite directions by their inherent spring tension and having crimped outer ends protruding outwardly beyond the adjacent side of the larger section 15 of the transverse frame member 3 for yieldable abutting engagement therewith to prevent accidental displacement thereof.

The longitudinal frame members 2 are secured in adjusted positions relative to the sections 15, 16, of the transverse frame members 3 by abutment against the protruding end portions of the fastening devices 19.

Figure 6:
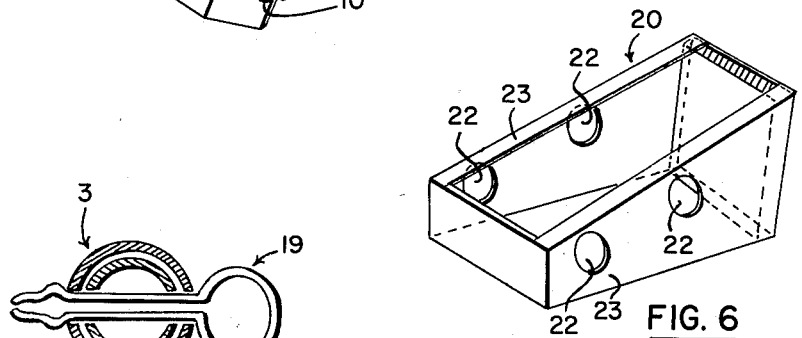
FIG. 6 is a perspective view showing the mounting for an outboard motor.

A mounting, indicated generally by the numeral 20, which is provided for an outboard motor 21, consists of a box-like structure, open at the top, having two parallel sides and having inclined bottom and end walls, as shown best in FIG. 6.

The mounting 20 has two pairs of openings 22 in its parallel sides, indicated by the numeral 23, which correspond to the openings 17, 18, of the adapter tray holders 7 and the elongated connecting elements 11, and are secured to two rearwardly positioned transverse frame members 3 in the same manner that the longitudinal frame members 2 are secured thereto.

One or more deck plates 24, which are supported on the transverse frame members 3, and advantageously may be formed of plywood or light weight sheet metal, such as aluminum, for example, are secured to selected transverse frame members 3, as shown best in FIGS. 8 to 10, by metal clips 25, formed of spring steel, which are passed thru openings 26 therefor in the deck plates 24, on opposite sides of the respective transverse frame members 3, in frictional engagement therewith.

The clips 25 each comprise an endless strip of metal which is bent to form a substantially flat top portion consisting of two thicknesses overlying the deck plate 24 and extending beyond opposite sides of the openings 26, and having two downwardly extending leg portions, each consisting of two thicknesses, which are passed downwardly thru the respective openings 26 and have their lower end portions biased inwardly by their inherent spring tension whereby they yieldably converge about the transverse frame member 3, in frictional engagement therewith.

As shown in FIG. 1, an umbrella 27 and a stool 28 are provided which advantageously may be secured to the deck plates 24 and the transverse frame members 3 by clips (not shown) similar to the clips 25.

FIGS. 12 to 15 illustrate a variety of tubular fittings, including an obtuse angular bend 29, a right angular bend 30, a T 31, and a cross 32, which advantageously may be employed in the erection of a superstructure such as the side rails, designated generally by the numeral 33, shown in FIG. 1, or the side rails 33 and the canopy support, indicated generally by the numeral 34, shown in FIG. 11.

As illustrated in FIG. 11, the side rails 33 and the canopy support 34 are secured to the frame of the raft by right angular fittings 30 which are connected to end portions of selected transverse frame members 3 which extend outwardly beyond the adjacent longitudinal frame members 2.

FIG. 16 shows an optional arrangement which includes a central longitudinal frame member 2 having two adapter tray holders 7 connected by an elongated connecting element 11, as above described, and having transverse frame members 3 extending outwardly from opposite sides thereof, and a pair of outrigger longitudinal frame members 2, connected to selected transverse frame members 3, each consisting only of a single adapter tray holder 7. The adapter tray holders 7 have float units 4 (not shown) associated therewith.

FIG. 17 shows an arrangement similar to that of FIG. 16 in which the central longitudinal frame member 2 consists only of a single adapter tray holder 7 having an elongated connecting element 11 operatively connected thereto, and in which the outrigger longitudinal frame members 2, each of which consists only of a single adapter tray holder 7, are positioned adjacent the end of the central longitudinal frame member 2 opposite the adapter tray holder 7 thereof.

The invention may be modified in various ways without departing from the spirit and scope thereof.

I claim:

1. A raft structure comprising a floating platform having a plurality of longitudinal frame members having side flanges connected in spaced apart relation to each other by a plurality of transverse frame members, and having a plurality of elongated float units arranged to support the platform in vertically adjustable position relative thereto, the float units each being arranged in vertical alignment with one of the longitudinal frame members, the longitudinal frame members each comprising an elongated float unit holder, channel shaped in transverse section, straddling a float unit and having means connecting it in vertically adjustable relation thereto, and at least one of the longitudinal frame members having an elongated connecting element, channel shaped in transverse section, connected to the float unit holder thereof, the elongated connecting element forming a longitudinal extension of the float unit holder and being adjustable telescopically relative thereto, the transverse frame members each comprising at least one tubular section and having portions thereof passed thru longitudinally spaced openings therefor in the side flanges of at least one of the longitudinal frame members, and the longitudinal frame members being adjustably positioned relative to the transverse frame members.

2. A raft structure comprising a floating platform having a plurality of longitudinal frame members connected in spaced apart relation to each other by a plurality of transverse frame members, and having a plurality of sets each consisting of a plurality of elongated float units arranged to support the platform in vertically adjustable position relative thereto, the float units of each set being arranged one behind another in vertical alignment with one of the longitudinal frame members, the longitudinal frame members each consisting essentially of a plurality of elongated float unit holders, channel shaped in transverse section, each straddling a float unit and having means connecting it in vertically adjustable relation thereto, and one or more elongated connecting elements, channel shaped in transverse section, connecting the float unit holders in spaced apart relation to each other, the elongated connecting elements forming longitudinal extensions of the float unit holders and being adjustable telescopically relative thereto, the transverse frame members each comprising a pair of tubular sections, adjustable telescopically relative to each other, and having portions thereof passed thru longitudinally spaced openings therefor in the side flanges of the float unit holders and the elongated connecting elements which together comprise the longitudinal frame members.

3. A raft structure comprising a floating platform having a pair of longitudinal frame members arranged along opposite sides thereof and connected intermediate their ends by a plurality of transverse frame members, and having two pairs of elongated float units arranged to support the platform in vertically adjustable position relative thereto, the float units of each pair being arranged one behind the other in vertical alignment with one of the longitudinal frame members, adjacent opposite ends thereof, the longitudinal frame members each consisting essentially of a pair of elongated float unit holders, channel shaped in transverse section, each straddling a float unit and having means connecting it in vertically adjustable relation thereto, and an elongated connecting element, channel shaped in transverse section, connecting the float unit holders in spaced apart relation to each other, the elongated connecting elements forming longitudinal extensions of the float unit holders of each pair and being adjustable telescopically relative thereto, the transverse frame members each comprising a pair of tubular sections, adjustable telescopically relative to each other, and having their opposite end portions passed thru longitudinally spaced openings therefor in the side flanges of the float unit holders and the elongated connecting elements which together comprise the longitudinal frame members.

4. The structure of claim 1, the float units each comprising an elongated float element and an inverted tray conforming to the top and peripheral surfaces of the float element fitted around the upper portion thereof, the tray having an end opening, normally closed by a hinged cover, whereby the float element is removably secured in engagement therewith, and having studs extending laterally outwardly from opposite sides thereof for engagement with vertical slots therefor in the side flanges of one of the float unit holders, beginning at their lower edges, whereby the float unit is adapted to be removably secured to the float unit holder for vertical adjustment relative thereto.

References Cited in the file of this patent
UNITED STATES PATENTS

| | | |
|---|---|---|
| 1,738,979 | Adelmann | Dec. 10, 1929 |
| 2,004,679 | Tinnerman | June 11, 1935 |
| 2,024,805 | Place | Dec. 17, 1935 |
| 2,674,971 | Therrien | Apr. 13, 1954 |
| 2,984,845 | Gregoire | May 23, 1961 |